Patented July 16, 1940

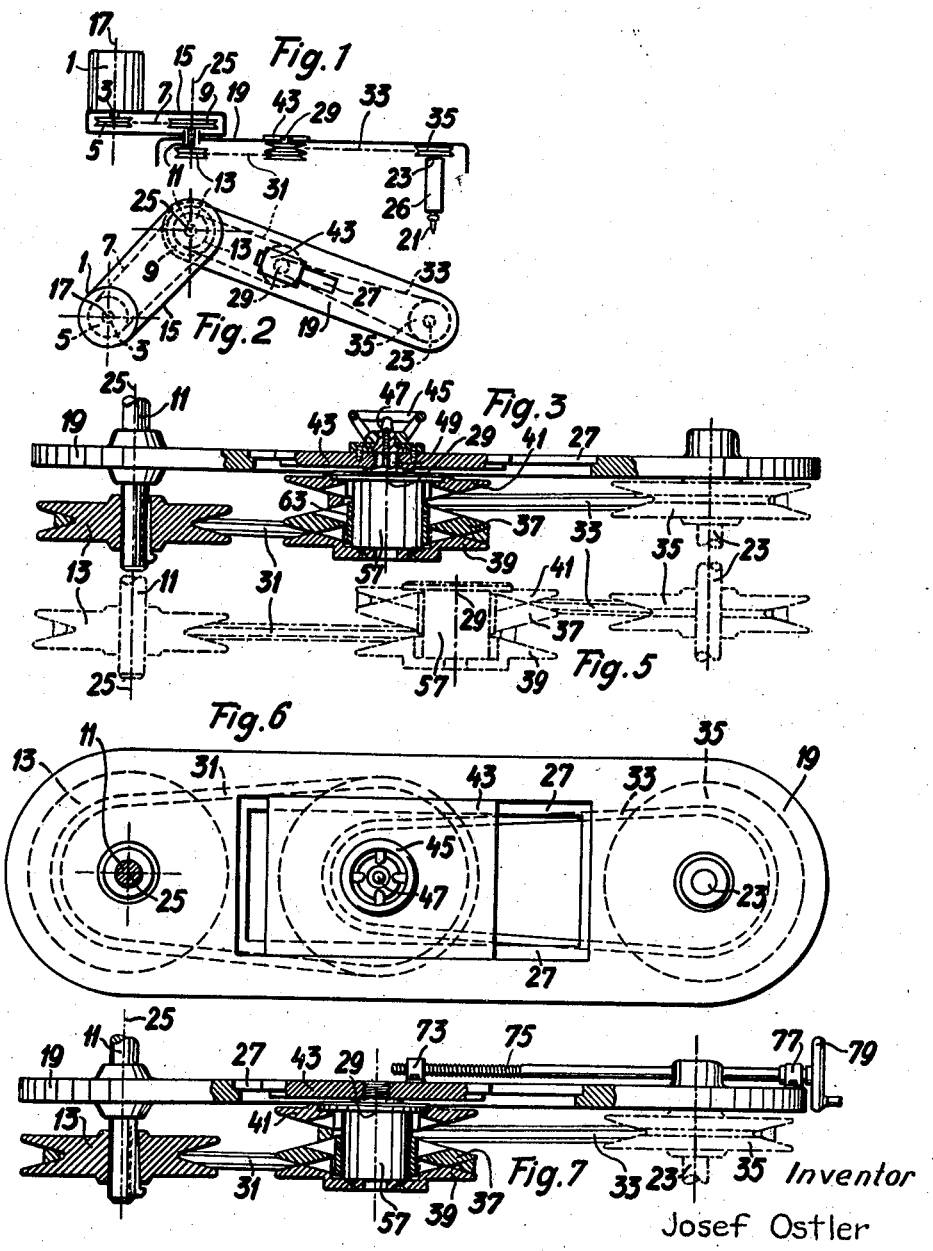

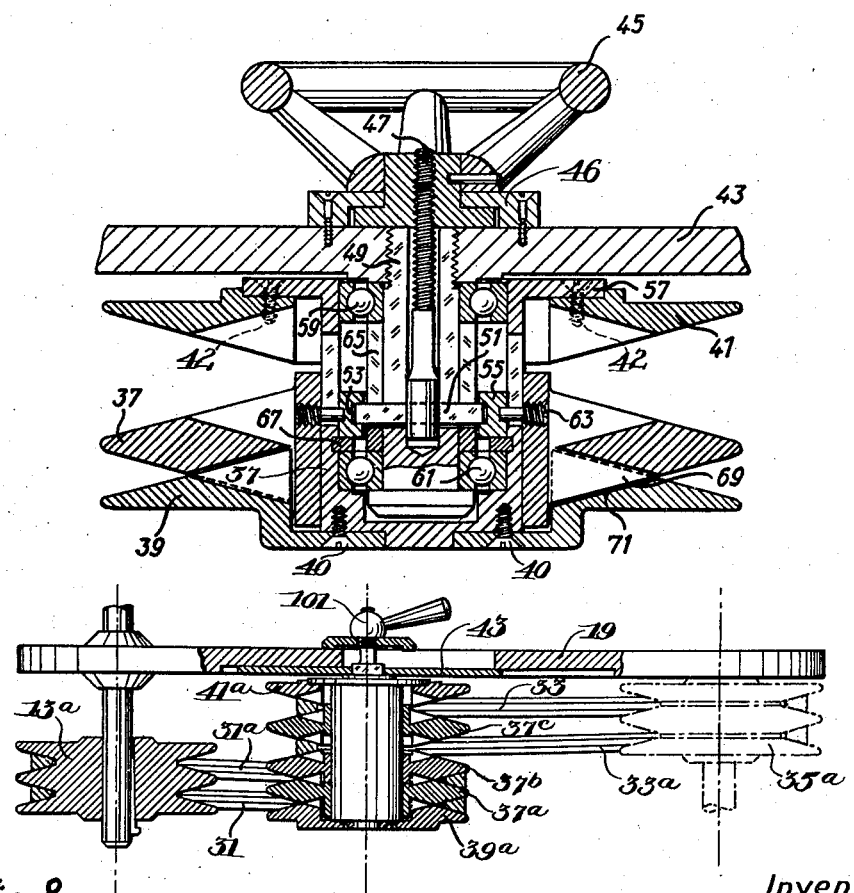

2,208,430

UNITED STATES PATENT OFFICE 2,208,430

VARIABLE DRIVE FOR SPINDLES OF ENGRAVING MACHINES AND THE LIKE

Josef Ostler, Munich, Germany, assignor to Friedrich Deckel, Munich-Prinz, Germany Application January 16, 1939, Serial No. 251,190
In Germany January 18, 1938

5 Claims. (Cl. 74—230.17)

This invention deals with means for driving a laterally movable spindle, such as the cutting tool spindle of an engraving machine, copying machine, profile milling machine, or similar machine, all of which are intended to be included in the term "engraving machine and the like" as used hereafter.

In such machines, an engraving, cutting, or milling tool is mounted on a spindle which is driven from a suitable source of power. The spindle is mounted for movement in a lateral direction to carry the tool to various positions over the work upon which the tool is operating, and sometimes also for movement in a longitudinal or axial direction, when the tool is doing "profiling" work or three-dimensional work, rather than operating upon flat or plane work.

Usually the spindle is driven from a source of power (such as an electric motor) which is mounted in a stationary position on the machine frame. As the tool moves over the work, the tool spindle on which the tool is mounted moves to different positions closer to or farther away from, or at different directions from the motor or other source of power. The means for driving the tool spindle from the source of power must, therefore, be some means which takes account of the varying positions of the spindle and which is adapted to drive the spindle continuously, notwithstanding its lateral movements. At the same time, the driving means should be so arranged that different driving ratios can be employed, in order that different speeds of rotation of the tool spindle can be secured, for a given speed of rotation of the electric motor or other source of power.

Heretofore the laterally movable tool spindles of engraving machines and the like have usually been driven by a belt drive employing stepped pulleys having a plurality of belt grooves of different diameters, so that the belt may from time to time be changed from one belt groove to another, in order to give a different driving ratio and a different speed of rotation of the spindle. Such drives have several disadvantages, among which may be mentioned the following: First, it is necessary to stop the drive while shifting the belt from one groove to another. Second, when the belt is shifted, it is frequently necessary to move the shafts on which the belt pulleys are mounted, relatively to each other, and to readjust the distance of the shafts from each other. Third, the use of stepped pulleys necessitates a change in driving ratio by abrupt steps, rather than a more desirable stepless change through infinitesimal increments. Fourth, the stepped pulley arrangement requires an undesirably long time for making changes in driving ratios.

An object of the present invention is to provide an improved and more satisfactory drive for the laterally movable spindles of engraving machines and the like, and particularly to provide such a drive which is free from the objections and drawbacks above mentioned.

More specifically, it is an object of the present invention to provide a drive for such spindles, in which the driving ratio may be varied or adjusted in a smooth and stepless manner through infinitesimal increments; and in which the change in ratio or variation in adjustment can be accomplished easily and quickly, while the driving of the spindle continues, without the necessity for stopping the drive, and without readjusting the main pulley shafts or varying their distance from each other.

To these and other ends the invention resides in certain improvements and combinations of parts, all as will be hereinafter more fully described, the novel features being pointed out in the claims at the end of the specification In the drawings:

Fig. 1 is a diagrammatic side elevation of the driving means in accordance with the present invention;

Fig. 2 is a plan thereof;

Fig. 3 is a side elevation of the parts in vertical section, showing in greater detail one embodiment of the drive, adjusted for one driving ratio;

Fig. 4 is a vertical section taken centrally through the ratio changing transmission means of the form shown in Fig. 3, on a still larger scale, illustrating details;

Fig. 5 is an outline view similar to Fig. 3 showing the parts adjusted for a different driving ratio;

Fig. 6 is a plan of the parts shown in Fig. 3,

Fig. 7 is a view similar to Fig. 3 showing a different embodiment of the invention, and Fig. 8 is another view similar to Fig. 3 showing still a different embodiment of the invention.

The same reference numerals throughout the several views indicate the same parts.

The construction of the engraving machine or the like (other than the driving means for driving the spindle) forms no part of the present invention, and consequently is not illustrated in the accompanying drawings. The machine, to which the drive of the present invention is applied, may be of any suitable known construction, having one or more tool spindles mounted for lateral movement, the tool spindles being supported, for example, on a pantograph linkage, or a parallel motion beam, or other form of support enabling the spindle or spindles to be moved laterally in order that the tool or tools mounted thereon may operate upon different portions of the work.

At a suitable point on the machine frame is mounted a source of power, such as the electric motor 1, which drives a shaft 3 having a pulley 5 thereon. A belt 7 runs over and is driven by the pulley 5, and in turn drives a pulley 9 on a second shaft 11, which shaft also carries another belt pulley 13.

The shaft 11 is laterally movable, and is maintained at a substantially constant distance from the shaft 3 by suitable spacer means such as the housing 15 which surrounds and protects the pulleys 5 and 9 and the belt 7, and which is mounted upon the machine frame, the motor frame, or other suitable part of the apparatus, to swing or oscillate about an axis 17 substantially coincident with the rotary axis of the shaft 3. The shaft 11 is journaled on and supported by the housing 15 and thus is able to move laterally by swinging the housing 15 about the axis 17, but remains at a constant distance from the axis 17 and from the shaft 3, so that the tension on the belt 7 remains substantially constant.

A cutting tool 21 is mounted in the usual manner on a spindle shaft 23 which, as above explained, is mounted so that it may be moved laterally, preferably in any direction, so that the tool 21 may operate upon any desired part of the work. Another housing 19 extends from the intermediate shaft 11 to the spindle shaft 23 and likewise acts as spacer means to keep the shaft 11 at a substantially constant distance from the spindle shaft 23. The spacer housing 19 is so mounted on the shaft 11 or on the housing 15 that it can swing or oscillate relatively to the housing 15 about the axis 25 as a center, substantially coincident with the rotary axis of the shaft 11, and it may also swing relatively to the spindle holder or bearing 26, substantially about the rotary axis of the spindle 23 as a center. With this arrangement, the spindle shaft 23 can move in any lateral direction so far as the spacer means 15 and 19 are concerned, by swinging the spacer means 15 and 19 relatively to each other or relatively to the machine frame, as required.

The spindle shaft 23 is provided with a belt pulley 35. Belt means running over the pulley 13 on the intermediate shaft 11 and over the pulley 35 on the spindle shaft 23 serves to drive the spindle shaft and the cutting tool from the motor 1. The housing 19 preferably surrounds and protects the pulleys 13 and 35 and the belt means, at the sides and top, although the bottom of the housing may be left open if desired.

According to the present invention, a stepless change speed transmission or gearing is mounted on one or the other of the two spacer housings 15 and 19 for cooperation with the belt means running along that spacer housing. This transmission or gearing may be placed on either of the spacer housings, as may be desired. If placed on the first spacer housing 15, it cooperates with the belt means between the pulleys 5 and 9 and may be used to change the driving ratio between the shafts 3 and 11. If placed on the other spacer housing 19, it cooperates with the belt means running between the pulleys 13 and 35, and may be used to change the driving ratio or speed ratio between the shaft 11 and the spindle 23. Usually it is more convenient to place the transmission or gearing on the housing 19, rather than on the housing 15, because when it is placed on the housing 19 it is closer to the operator standing adjacent the tool spindle 23 and thus can be more readily reached by him without moving his position, for purposes of changing the driving ratio. The drawings illustrate the transmission in this preferred location on the spacer housing 19, and those skilled in the art will readily understand that exactly the same construction might be applied to the other spacer housing 15 if desired.

In the construction here illustrated as a preferred example, the spacer housing 19 is provided with a slideway or guideway 27 extending approximately in the direction of a line joining the two shafts 11 and 23. A slide member or carriage 43 is slidable along this guideway 27, and on this carriage is mounted a stepless transmission or change speed gear, indicated as a whole by the numeral 29. A belt 31 extends from the pulley 13 on the shaft 11 to the transmission 29, and another belt 33 extends from the transmission 29 to the pulley 35 on the spindle shaft 23. By adjusting or varying the transmission 29, the driving ratio between the belts 31 and 33 can be altered, and thus the speed of the spindle 23 relatively to the shaft 11 can be changed.

In the form of construction shown in Figs. 3 to 6, the transmission 29 includes an intermediate pulley flange 37 slidable axially between two other pulley flanges 39 and 41 which are fixed relatively to each other. On the slide or carriage 43 on which the transmission is mounted, there is a hand wheel 45 mounted for rotation but held against axial movement by the annular flange 46. The hand wheel has a central threaded opening engaged with threads on a rod 47, so that when the hand wheel is turned it acts as a nut on the rod 47 and causes longitudinal movement of the rod. This rod is axially movable within a stationary tubular shaft 49 fixed to the slide 43 and having longitudinal slots at two diametrically opposite points, through which slots a cross pin 51 mounted on the rod 47 extends. As the rod 47 is moved in one direction or the other by turning the hand wheel 45, the pin 51 slides in the slots of the tubular shaft 49, but the pin and slot arrangement prevents the rod 47 from turning.

The ends of the pin 51 engage in an annular groove 53 in a ring 55 which is mounted to slide in a direction axially of the rod 47 and shaft 49, within a tube 57 rotatably mounted on ball bearings 59 and 61 on the tubular shaft 49. The intermediate or movable pulley flange 37 surrounds this tube 57 and is slidable axially along it. The tube has longitudinal slots, and screws 63 extend from the pulley flange 37 inwardly through the slots in the tube 57 and into holes in the ring 55.

A stationary sleeve 65, having longitudinal slots to accommodate the pin 51, may be inserted between the two ball bearings 59 and 61. The end flanges or outside pulley flanges 39 and 41 are fixed to the tube 57 by means of screws 40 and 42. These two end flanges, along with the intermediate flange 37, all rotate together as a unit when the sleeve 57 turns on its bearings 59 and 61. During such rotation, the ring 55 also rotates, but the pin 51 remains stationary, except when being adjusted by the hand wheel 45. A spring ring 67 engaging in an annular slot of the sleeve 57 and overlying the bearing 61, prevents axial movement of the sleeve 57 relatively to its bearings and to the tubular shaft 49.

By turning the hand wheel 45 in one direction, the intermediate flange 37 may be moved downwardly toward the bottom pulley flange 39, thus narrowing the belt space between the flanges 37 and 39 and widening the belt space between the flanges 37 and 41. Conversely, by turning the hand wheel 45 in the opposite direction, the intermediate pulley flange 37 may be moved upwardly toward the flange 41, narrowing the belt space between the flanges 37 and 41, and widening the belt space between the flanges 37 and 39. The flanges are made with inclined faces so that the belt spaces between them are of approximately V-shape, as plainly seen from Figs. 3 and 4. The belts used are preferably of the kind usually called V-shaped belts, which are of trapezoidal form with two opposite sides inclined and converging toward each other at the same angle as that of the faces of the pulley flanges. Hence the belts 31 and 33 will run at effective diameters determined by the spacing of the pulley flanges from each other.

The distance between the shafts 11 and 23 may remain constant when a change in the transmission ratio is made, because when one belt groove is widened to make the belt run at a smaller effective diameter, the other belt groove is correspondingly narrowed to make its belt run at a correspondingly greater effective diameter, and the amount of lengthening of the belt track around one belt groove is substantially equal to the amount of shortening of the belt track around the other belt groove. This can be compensated for by moving the transmission 29 in one direction or the other along the guideway 27, without altering the spacing of the shafts 11 and 23 from each other. The slide 43 is preferably freely slidable without restraint along the guideway 27 so that when the hand wheel 45 is turned to vary the adjustment, the slide 43 will automatically adjust itself in one direction or the other along the guideway 27 until the two belts 31 and 33 pull with substantially equal forces counterbalancing each other. When the slide 43 finds its proper position along the guideway, the belt tension will then be substantially the same as it was before the change or adjustment was made.

To increase the range of travel of the central pulley flange 37 and thus to effect a greater variation in the effective width and effective diameter of the belt grooves, each of the fixed pulley flanges 39 and 41 is preferably provided with alternate cut out portions leaving teeth 69 between them, which teeth may engage in corresponding recesses 71 in the intermediate movable flange 37. Since there is no relative rotation between the flange 37 and the fixed flanges 39 and 41, it follows that the teeth on the central flange 37 are always alined with the recesses in the flanges 39 and 41, and the teeth on the fixed flanges are always alined with the recesses in the movable flange 37, so that there is no difficulty in the teeth entering the recesses wherever required. With this arrangement, the movable flange 37 may be brought very close to either one of the fixed flanges, as will be seen from Fig. 4. At the same time, the teeth on the opposite side of the flange 37 and on the adjacent face of the more remote end flange form a bearing for the belt which runs in this groove, which now is reduced to or close to its minimum effective diameter. Preferably the parts are so proportioned that in every position of the intermediate flange 37, the teeth thereof are engaged in the recesses of one or the other of the end flanges 39 and 41.

In Figs. 3, 4, and 6 the parts are shown adjusted to provide approximately a maximum diameter of the groove receiving the belt 31 driven from the shaft 11 and approximately a minimum diameter for the pulley groove receiving the belt 33 which drives the spindle shaft 23. In Fig. 5 the same parts are diagrammatically shown adjusted for a minimum diameter of the groove receiving the belt 31 and a maximum diameter of the groove receiving the belt 33, so that a substantially different transmission ratio is provided and the spindle 23 is driven at a much faster speed relatively to the speed of rotation of the shaft 11. Any degree of change between these two extreme positions is possible, since the change in transmission is not by abrupt steps as in the case of stepped pulleys, but is a smooth stepless change through an infinite number of infinitesimal increments. Thus any desired speed of rotation of the tool spindle 23 (within the upper and lower limits of the mechanism) is easily attainable simply by turning the hand wheel 45, and this can be done without stopping the driving of the belts and while the parts are all in motion. The change can be accomplished with the greatest ease and speed, and without the necessity of readjusting even temporarily the position of the spindle shaft 23 with respect to the shaft 11.

When the position of the pulley flange 37 is positively controlled in the manner above described, the position of the slide 43 along the guideway 27 need not be positively controlled, as it will automatically assume the proper position along the guideway. On the other hand, it is possible to control positively the position of the slide 43 along the guideway 27, and when this is done, there is no necessity for positively controlling the position of the flange 37, as it will automatically assume the position required by the position in which the slide 43 is set. Such a modified arrangement is shown in Fig. 7 of the drawings, where the parts are the same as before and bear the same reference numerals, except that the hand wheel 45 and associated parts for moving the flange 37 are omitted, and this flange is free to move back and forth between the flanges 39 and 41 without positive restraint. The slide 43 is provided with a bracket 73 which is threaded to receive screw threads on a rod 75 journaled at 77 on the spacer housing 19 in a manner which permits the threaded rod 75 to be turned by the hand wheel 79, but restrains the rod against longitudinal movement. Therefore, when the hand wheel 79 is turned, the threads on the rod serve to move the slide 43 in one direction or the other along the guideway 27. This pulls tighter on one of the belts 31 and 33 and loosens the other belt, and as a result thereof the movable pulley flange 37 moves away from the belt which is pulled tighter and toward the belt which is loosened, until the effective belt diameters of the two pulley grooves are changed to the point where the tension on both belts is approximately equal. Thus the same result of changing the transmission ratio is secured, as in the construction previously described.

Preferably the threads on the rod 47 in the first form described, and on the rod 75 in the second form described, are of the self-stopping type, that is having a pitch and shape such that they are irreversible and the parts can not be moved by force exerted longitudinally on the pin 47 or the threaded bracket 73, but only by positively turning the threaded parts such as by means of the hand wheel. When the threads are of this self-stopping form, the parts will remain set indefinitely in any position to which they may be adjusted. If the threads are made of a form which is not self-stopping, then any suitable clamp or locking device may be provided to hold the hand wheel 45 or threaded rod 75 against rotation.

In both forms of construction described, a calibrated scale or dial arranged alongside the slide 43 can be employed for purposes of setting the transmission parts to any desired transmission ratio, or for quickly reading the transmission ratio to which the parts are set.

A further simplification of the construction is possible, by omitting not only the hand wheel 45 and associated parts for positively moving the pulley flange 37, but also the threaded rod 75 and bearing 73. The slide 43 may then be moved back and forth along its guideway 27 by hand, and held in any desired position by any suitable means such as set-screws or other clamping devices such as indicated at 101 in Fig. 8.

For the transmission of greater force than is conveniently possible through a single belt, the construction may be duplicated by using any desired number of fixed pulley flanges and intermediate movable pulley flanges so that any desired number of belts can be used, the spacing of the belt grooves and effective diameters thereof all being changed simultaneously. Such an arrangement is illustrated in Fig. 8, where duplicate belts 31 and 31a are shown, as well as duplicate belts 33 and 33a. The pulley 13a here has two belt grooves, as has also the pulley 35a. The variable transmission pulley has two fixed flanges 39a and 41a, and three intermediate movable flanges 37a, 37b, and 37c, corresponding in general to, and operating in the same manner as the movable flange 37 in the embodiment previously described.

While certain embodiments of the invention have been disclosed it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A variable speed drive for laterally movable spindles of engraving machines and the like, said drive including a driving shaft, a pulley thereon, a second shaft, pulley means thereon, flexible driving means running from said pulley on said driving shaft to said pulley means on said second shaft to drive said pulley means, first spacer means for holding said second shaft at a predetermined distance from said driving shaft, said spacer means and said second shaft being mounted for swinging movement approximately about said driving shaft as a center, a laterally movable spindle to be driven, second spacer means for holding said spindle at a predetermined distance from said second shaft, said second spacer means being pivoted with respect to said first spacer means to swing relative thereto as said spindle is moved from place to place to positions at different distances from said driving shaft, a pulley on said spindle, and means for variably driving said pulley on said spindle from said pulley means on said second shaft, said variable driving means including a belt running over said pulley means on said second shaft, a second belt driven from said first belt and running over said pulley on said spindle, and means for changing the driving ratio between said second belt and said first belt while said belts are running and while said spindle is maintained at said predetermined distance from said second shaft.

2. A variable speed drive for laterally movable spindles of engraving machines and the like, said drive including a driving shaft, an intermediate shaft, a spindle shaft, said intermediate shaft and said spindle shaft being approximately parallel to said driving shaft and being laterally movable relatively to each other and to said driving shaft, first spacer means mounted for swinging movement substantially about said driving shaft as a center and connected to said intermediate shaft to hold said intermediate shaft at a substantially constant distance from said driving shaft, second spacer means connecting said intermediate shaft and said spindle shaft to hold them at a substantially constant distance from each other, said second spacer means being pivoted with respect to said first spacer means to swing relative thereto as said spindle shaft is moved from place to place to positions at different distances from said driving shaft belt means running approximately along said first spacer means for driving said intermediate shaft from said driving shaft, belt means running approximately along said second spacer means for driving said spindle shaft from said intermediate shaft, and means mounted on and supported by one of said spacer means and cooperating with the belt means running therealong for changing the driving ratio between the two shafts operatively connected by such belt means while said belt means is running and while said two shafts remain at substantially constant distance from each other.

3. A variable speed drive for laterally movable spindles of engraving machines and the like, said drive including a driving shaft, an intermediate shaft, a spindle shaft, said intermediate shaft and said spindle shaft being approximately parallel to said driving shaft and being laterally movable relatively to each other and to said driving shaft, first spacer means mounted for swinging movement substantially about said driving shaft as a center and connected to said intermediate shaft to hold said intermediate shaft at a substantially constant distance from said driving shaft, second spacer means connecting said intermediate shaft and said spindle shaft to hold them at a substantially constant distance from each other, said second spacer means being pivoted with respect to said first spacer means to swing relative thereto as said spindle shaft is moved from place to place to positions at different distances from said driving shaft, belt means running approximately along said first spacer means for driving said intermediate shaft from said driving shaft, belt means running approximately along said second spacer means for driving said spindle shaft from said intermediate shaft, means mounted on and supported by one of said spacer means and cooperating with the belt means running therealong for changing the driving ratio between the two shafts operatively connected by such belt means while said belt means is running and while said two shafts remain at substantially constant distance from each other, said driving ratio changing means including a stub shaft mounted on said one of said spacer means for movement in a direction approximately longitudinally of said spacer means, two pulley flanges rotatably mounted on said stub shaft and fixed relatively to each other, and a third pulley flange mounted between said two fixed flanges for movement in a direction axially of said stub shaft and toward one or the other of said two fixed flanges, each of said fixed flanges forming with said movable flange a pulley groove of variable width adapted to receive a V-shaped belt.

4. A construction as described in claim 3, further including a slide mounted on said one of said spacer means for movement in a direction approximately longitudinally of said spacer means, said stub shaft being mounted on said slide to move bodily therewith, a rod mounted on said one of said spacer means and extending therealong substantially in said direction of movement of said slide, manually operable means for turning said rod, means on said one of said spacer means for holding said rod against longitudinal movement relative to said spacer means, screw threads on said rod, and a part on said slide threadedly engaging said threads on said rod so that turning said rod causes movements of said slide and said stub shaft in a direction along said spacer means.

5. A construction as described in claim 3, in which said stub shaft is of hollow formation throughout a part of its length and is provided with a longitudinal slot through the wall on one side of said hollow part, further including a rod extending longitudinally in said hollow part of said stub shaft, screw threaded means for moving said rod longitudinally with respect to said stub shaft, a cross pin operatively connected to said rod and extending laterally through said slot, and an operative connection between said cross pin and said third pulley flange for moving said third flange in a direction axially of said stub shaft upon longitudinal movement of said rod by said screw threaded means.

JOSEF OSTLER.

CERTIFICATE OF CORRECTION.

Patent No. 2,208,430. July 16, 1940.

JOSEF OSTLER.

It is hereby certified that the residence of the assignee in the above numbered patent was erroneously described and specified as "Munich-Prinz, Germany", whereas said residence should have been described and specified as --Munich-Prinz Ludwigshöhe, Bavaria, Germany--, as shown by the record of assignments in this office; and that the said Letters Patent should be read with this correction therein that the same may conform to the record of the case in the Patent Office.

Signed and sealed this 10th day of September, A. D. 1940.

(Seal)

Leslie Frazer,
Acting Commissioner of Patents.